No. 713,302. Patented Nov. 11, 1902.
J. H. HENDY.
AUTOMATIC LATCH FOR DUMP CARS.
(Application filed May 26, 1902.)
(No Model.)
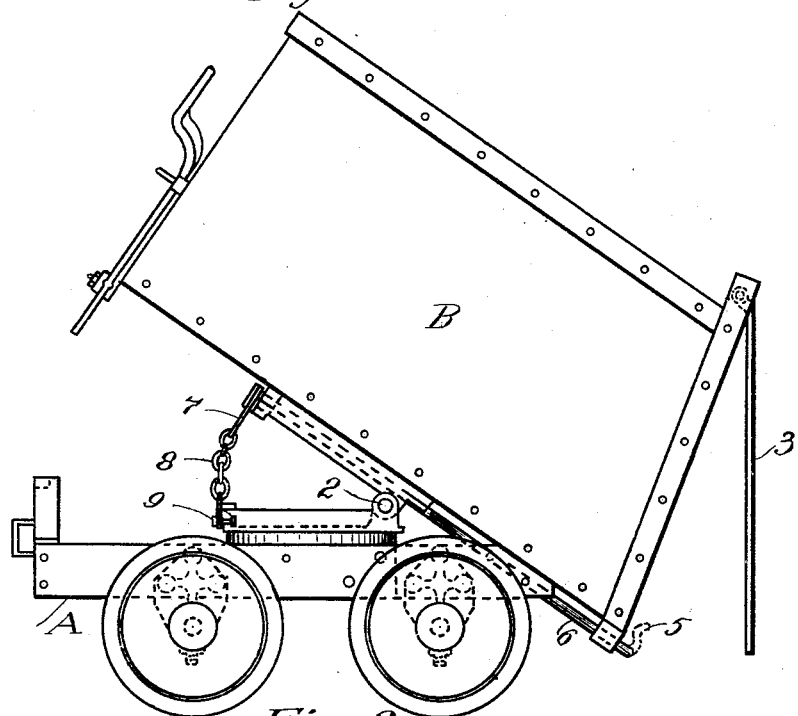
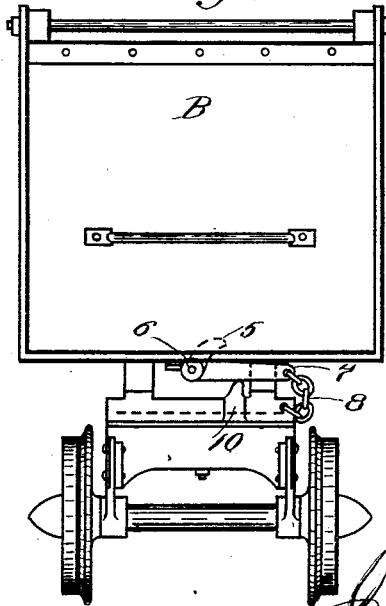

UNITED STATES PATENT OFFICE.

JOHN H. HENDY, OF SAN FRANCISCO, CALIFORNIA.

AUTOMATIC LATCH FOR DUMP-CARS.

SPECIFICATION forming part of Letters Patent No. 713,302, dated November 11, 1902.

Application filed May 26, 1902. Serial No. 108,983. (No model.)

*To all whom it may concern:*

Be it known that I, JOHN H. HENDY, a citizen of the United States, residing in the city and county of San Francisco, State of California, have invented an Improvement in Automatic Latches for Dump-Cars; and I hereby declare the following to be a full, clear, and exact description of the same.

My invention relates to a latching device for ore and other dumping cars.

It consists of a longitudinally-journaled bolt having a latch at the outer end adapted to engage the lower edge of the hinged door and hold it closed, a lever-arm projecting from the inner end of the shaft, and a flexible connection between said arm and the swivel-plate of the truck, whereby the lever is pulled and the shaft turned to disengage the latch when the car is tilted upon the truck for the purpose of discharging. A lug is so fixed upon the plate as to contact with the lever when the car-body is returned to its normal position and to thus rotate the shaft so as to cause the latch to engage the door after the latter has been closed.

It also comprises details of construction, which will be more fully explained by reference to the accompanying drawings, in which—

Figure 1 is a side elevation of a dump-car embodying my invention and showing the car in the position of dumping. Fig. 2 is an end view.

As shown in the accompanying drawings, A is the truck of an ore-car, and B is the containing box or body of the car.

2 is a fulcrum or pivot-pin by which the body is connected with the swivel-plate and about which it is tiltable, so that it stands in a normally horizontal position or may be tilted to stand at an incline for the purpose of discharging.

The end or side of the car through which the discharge takes place is provided with a door 3, which is hinged at the top. The end of the car against which the door closes is slightly inclined, so that the door will be closed before the box arrives at a horizontal position and would not open by gravity until it has been considerably tilted from a horizontal position. In order to secure this door in a closed position to retain the contents of the box, I have shown a latch 5, fixed to or formed upon the end of a shaft 6, which is suitably journaled beneath the floor of the car-body and is turnable in its journals. Upon the inner end of this shaft is fixed a lever-arm 7, and the outer end of the lever-arm is connected by a chain 8 or other suitable flexible connecting device with a stud or bolt fixed upon the swivel-plate of the car-truck, as at 9.

The operation of this device will then be as follows: When the car is in a horizontal position, the contact of the lever-arm with the plate will have turned the shaft so as to cause the latch to engage the bottom of the door and retain it closed, the incline and the discharge end of the car being such that the door will close by gravitation before the car quite reaches its horizontal position. When a loaded car is to be discharged, it is tilted about its fulcrum or pivot-pin, and when it nearly reaches the extreme limit of its tilting movement, so that the bottom will contact with and rest upon the swivel-plate, the pull of the chain 8 upon the lever 7 will rotate the lever and shaft 6 sufficiently to disengage the latch and allow the door to swing open and the contents to discharge. When the car-body is returned to its normally horizontal position, the door will, as before stated, close against the inclined end a short time before the car actually reaches its horizontal position. The lever-arm will then contact with a projecting lug 10, fixed upon the plate, and this will force the lever-arm up against the bottom of the car-body, turning the shaft, and with it the latch, until the latter again engages the bottom of the door and locks it.

The operations of locking and unlocking the door are thus made automatic and in unison with the tilting of the car-body to its normally horizontal or to the discharge position.

Having thus described my invention, what I claim, and desire to secure by Letters Patent, is—

1. The combination in a dumping-car of a wheeled truck, a car-body fulcrumed and tiltable thereon, a discharge-door hinged at the top and closable against the open end of the car, a shaft journaled below the car-body having a latch upon the outer end, a lever-arm upon the inner end, and connections between said arm and the truck whereby the shaft is turned to disengage the latch when the car is tilted and to engage the closed door when the car is returned to its normally horizontal position.

2. The combination in a dumping-car of a wheeled truck, a car-body hinged thereto and tiltable about its hinge-joint, said body having an inclined open discharge end, a door hinged at the top and closable against said end, a shaft journaled and turnable beneath the car-body having a latch at its outer end adapted to engage and retain the door when closed, a lever connected with the inner end of the shaft and a flexible connection between said lever and the truck whereby the shaft is turned to disengage the latch when the car-body is tilted to discharge.

3. The combination in a dumping-car of a wheeled truck, a car-body hinged and tiltable thereon, said body having an inclined open discharge end, a door hinged at the top, closable over said opening, a shaft journaled and turnable longitudinally beneath the car having a latch at its outer end adapted to engage the lower edge of the door, a lever-arm projecting transversely from the inner end of the shaft, a flexible connection between said arm and the truck whereby the arm is actuated to turn the shaft and disengage the latch when the car has nearly reached the limit of its tilting movement and a lug or projection upon the truck adapted to engage the lever and turn the shaft and latch to engage the closed door when the car has nearly reached its normally horizontal position.

In witness whereof I have hereunto set my hand.

JOHN H. HENDY.

Witnesses:
S. H. NOURSE,
JESSIE C. BRODIE.